US008843937B2

(12) United States Patent
Renault

(10) Patent No.: US 8,843,937 B2
(45) Date of Patent: Sep. 23, 2014

(54) ELECTRONIC CONTROL UNIT HAVING A REAL-TIME CORE MANAGING PARTITIONING

(75) Inventor: Guy Renault, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 13/502,460

(22) PCT Filed: Oct. 19, 2010

(86) PCT No.: PCT/EP2010/006361
§ 371 (c)(1),
(2), (4) Date: Apr. 17, 2012

(87) PCT Pub. No.: WO2011/047823
PCT Pub. Date: Apr. 28, 2011

(65) Prior Publication Data
US 2012/0216213 A1    Aug. 23, 2012

(30) Foreign Application Priority Data
Oct. 22, 2009    (FR) ...................................... 0905077

(51) Int. Cl.
*G06F 9/46*    (2006.01)
*G06F 9/50*    (2006.01)
(52) U.S. Cl.
CPC .................................. *G06F 9/5016* (2013.01)
USPC ...................................................... 718/104
(58) Field of Classification Search
None
See application file for complete search history.

(56) References Cited

U.S. PATENT DOCUMENTS

| 7,010,602 | B2 * | 3/2006 | Poindexter et al. ........... 709/226 |
| 2004/0117575 | A1 * | 6/2004 | Link et al. ..................... 711/163 |
| 2005/0050189 | A1 * | 3/2005 | Yang .............................. 709/223 |
| 2006/0107264 | A1 |  5/2006 | Schmidt et al. |

OTHER PUBLICATIONS

"Partitioning in Avionics, Architectures: Requirements, Mechanisms, and Assurance" NASA/CR-1999-209347 Final Report, [Online] vol. DOT/FAA/AR-99/58, Mar. 2000, pp. 1-62.
K. Hjortnaes et al., "Time and Space Partitioning in Spacecraft Avionics" *Third IEEE International Conference on Space Mission Challenges for Information Technology*, Jul. 19, 2009, pp. 13-20.
L. Luo et al., "Partitioning based operating system: a formal model", [Online] vol. 37, No. 3, Jul. 2003, pp. 23-35.

* cited by examiner

*Primary Examiner* — Gregory A Kessler
(74) *Attorney, Agent, or Firm* — Muncy, Geissler, Olds & Lowe, P.C.

(57) ABSTRACT

An electronic control unit having a microcontroller provided with RAM associated with variable data and ROM associated with the code of a software operating system incorporating a real time core for executing computer tasks. The RAM and ROM include zones corresponding to partitions, one of which is allocated to the real time core, while each of the others is allocated to at least one of the tasks. The RAM and the ROM are associated with an address bus that is physically programmed so that each partition is prevented firstly from writing in another one of the zones of the RAM, and secondly from executing another one of the zones of the ROM. The real time core is associated with a timer for allocating an execution time to each partition.

11 Claims, 2 Drawing Sheets

ELECTRONIC CONTROL UNIT HAVING A REAL-TIME CORE MANAGING PARTITIONING

FIELD OF THE INVENTION

The present invention relates to an electronic control unit having a real time core managing partitioning. The present invention is intended more particularly for aviation applications.

BACKGROUND OF THE INVENTION

In such applications, a control unit called a full authority digital engine controller (FADEC) is known that comprises a microcontroller incorporating a software operating system for executing computer applications tasks. These applications may be executed in full or in part in simultaneous manner. The operating system incorporates a real time core, i.e. it is a real time operating system (RTOS) for managing the execution of applications and for ensuring that data is routed between two applications and between the applications and the hardware. Partitioning is provided with partitions that are allocated to each application in order to avoid applications interfering with one another while they are being executed. In the field of aviation, such partitioning is governed by the ARINC 653 standard that provides for space-division partitioning, thereby guaranteeing that an application cannot write in a memory zone corresponding to a partition of another application, and for time-division partitioning that guarantees that some execution time is allocated to each application. This partitioning makes it possible to have applications from different suppliers and/or of different degrees of criticality. Real time cores that are compatible with the ARINC 653 standard are nevertheless burdensome and they present the drawback of the partitioning being performed purely in software, such that it might be rendered ineffective by an application executing outside the control of the real time core.

Furthermore, in multi-tasking cores, when the core scheduler instructs a changeover from a first task to a second task, the context of the first task (i.e. all of the state values of the microcontroller that are needed for its execution and that are recorded in particular in the memory registers of the microcontroller) need to be backed up while the context of the second task needs to be found and restored. Changes of context are thus relatively time-consuming, particularly since microcontrollers have ever-increasing numbers of registers for backing up. Partition changes are just as lengthy, for the same reasons. This constitutes an additional drawback for multi-tasking cores compatible with the ARINC 653 standard.

SUMMARY OF THE INVENTION

An object of the invention is to provide a control unit that provides strong space-division and time-division partitioning.

To this end, the invention provides an electronic control unit comprising a microcontroller provided both with read-only memory (ROM) containing code of a software operating system incorporating a real time core for executing computer tasks, and with random-access memory (RAM) containing variable data associated with the tasks. The ROM and the RAM have zones corresponding to partitions, one of which is allocated to the real time core, while each of the others is allocated to at least one of the tasks. The ROM and the RAM are associated with an address bus that is physically programmed to prevent each partition firstly from writing in another of the zones of the RAM, and secondly from executing another of the zones of the ROM, and the real time core is associated with a timer for allocating an execution time to each partition.

Thus, the address bus is physically programmed in such a manner that a task executed in any one partition has no hardware means for writing data or for executing code in a partition other than the partition that is allocated thereto. Data exchange cannot take place between partitions without involving the real time core and via programming of the address bus. The real time core thus guarantees the integrity of the data in partitions other than the partitions currently being executed. The real time core also guarantees that each task can be executed by allocating an execution time window to each task. The tasks can therefore be executed concurrently, while minimizing any risk of mutual disturbance as a result of their execution.

Advantageously, the real time core is arranged to cause the partitions to be executed in an execution cycle that is circular and, more preferably, the execution cycle may include a given partition several times over.

Such a cycle is simple to manage.

Also preferably, the execution cycle includes a time reserve interval.

The time reserve enables one or more tasks to be added in simple manner without completely reorganizing the execution cycle.

According to a first particularly advantageous characteristic of the invention, the partition allocated to the real time core contains memory pages, each of which is allocated to a task in order to contain the registers of each task, the real time core being arranged to manage a task pointer for containing the address of the page of the task that is being executed.

This makes it possible to accelerate register changing by avoiding the need to back up the registers of the current task in a predefined fixed address zone and for restoring the registers of the task that is to be executed. This results in a change of context that is relatively fast with a duration that is independent of the number of registers. This also makes it possible to provide partitioning of the registers by requiring an appropriate control of the task pointer in order to access a register.

According to a second particularly advantageous characteristic of the invention, the partition allocated to the real time core contains a list of tasks ready to be executed and organized by partition, and the real time core is arranged to manage a partition pointer for accessing the list of ready tasks and, preferably, the list of ready tasks is in the form of a chaining head that contains the context addresses of the first and last tasks that are ready to be executed.

This enables partition changing to be performed quickly, merely by updating the partition pointer.

BRIEF DESCRIPTION OF THE DRAWINGS

Other characteristics and advantages of the invention appear on reading the following description of particular, non-limiting embodiments of the invention.

Reference is made to the accompanying drawings, in which.

DETAILED DESCRIPTION OF THE PREFERRED EMBODIMENTS

The invention is described herein in an aviation application to controlling one or more aircraft engines. In this example, the control unit is of the FADEC type and it complies with the ARINC 653 standard.

With reference to the figures, the control unit in accordance with the invention is a system-on-chip (SOC) type microcircuit including the program instructions for a microcontroller and its peripherals. The control unit may equally well be implemented in the form of a field programmable gate array (FPGA). By way of example, the microcontroller may be written in the VHDL language and it may be reprogrammable. (Where VHDL stands for very high speed integrated circuit hardware description language.)

The control unit thus comprises a microcontroller 1 having ROM 2 and RAM 3. The control unit also includes in particular means that are not shown for making connections with sensors that are arranged on the or each engine and with control instruments that are arranged in the cockpit of the aircraft.

The ROM 2 has zones corresponding to partitions (P0 to P3), one of which is allocated to the code of a software operating system, while the others are each allocated to applications code or computer programs including tasks. The ROM 2 is associated with an address bus that is physically programmed so that each partition is capable of executing code in a memory zone of the ROM other than the zone that corresponds thereto. The software operating system incorporates a real time core having the functions of scheduling tasks and of guaranteeing that predetermined time constraints are complied with for executing the tasks. The partition P0 thus corresponds to the real time core code while the other partitions (here the partitions P1 to P3) correspond respectively to the code for one or more tasks (here tasks T1 to T6).

The RAM 3 has zones corresponding to the partitions P0 to P3, one of which is allocated to the real time core, while the others are each allocated to at least one of the tasks, and the RAM is associated with an address bus that is physically programmed so that each partition is incapable of writing into a zone of the RAM other than the zone that corresponds thereto. The partition P0 is thus allocated to data and other variables of the real time core, while the other partitions (here the partitions P1 to P3) are respectively allocated to the data of one or more tasks (here the tasks T1 to T6).

Figure 1:
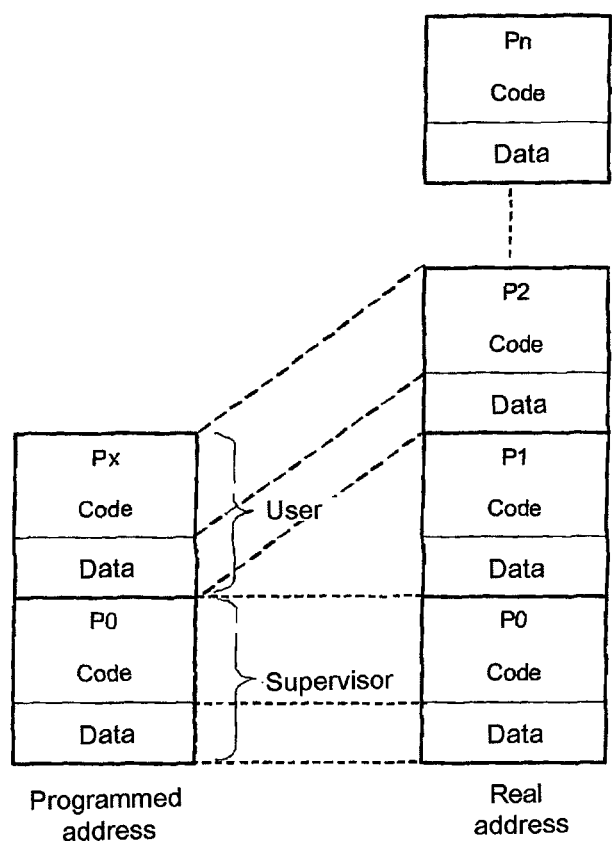
FIG. 1 is a diagrammatic representation of the space-division partitioning of ROM and RAM.
Figure 2:
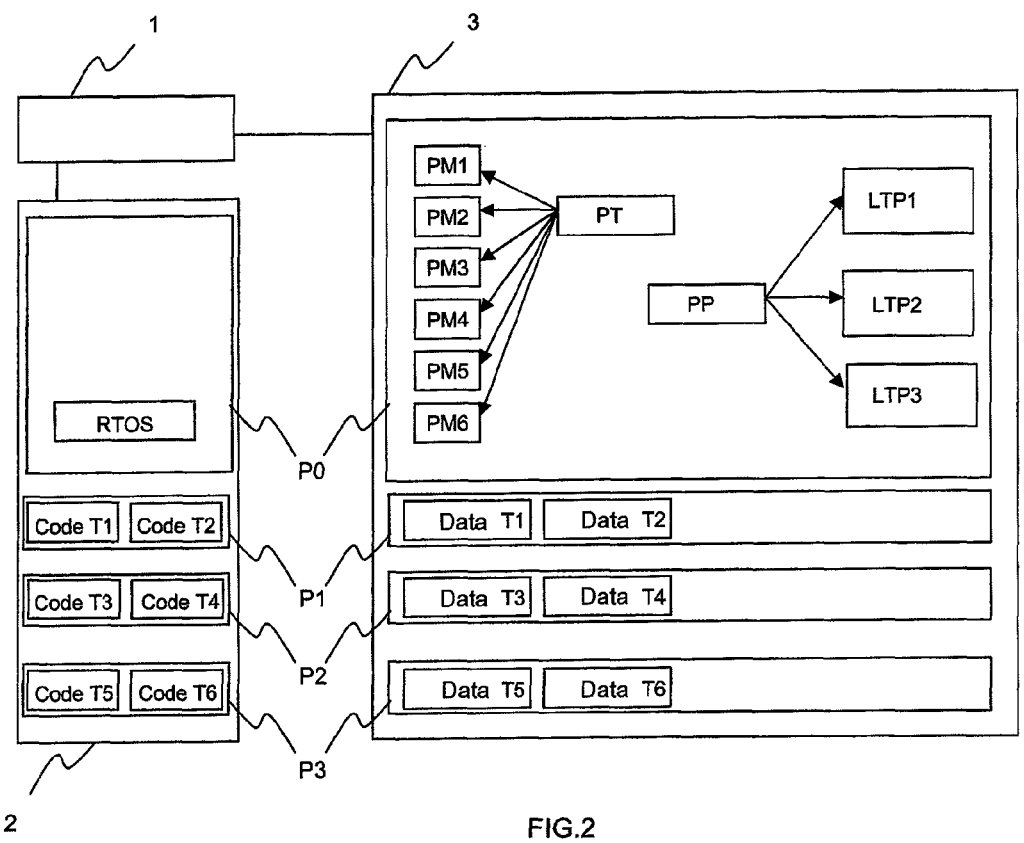
FIG. 2 is a diagrammatic representation of the control unit in accordance with the invention, showing in particular how the RAM partitioning is organized.
Figure 3:
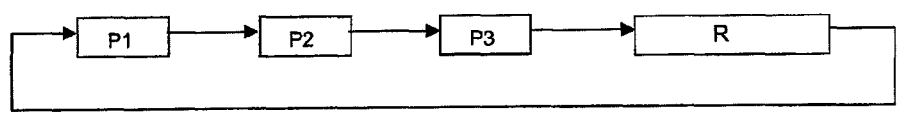
FIG. 3 is a diagrammatic representation of the ordering of the partitions.

This thus provides space-division partitioning that is implemented by means of a virtual addressing mechanism managed by a memory controller that is incorporated in the microcontroller and that manages an address bus and a data bus (by analogy with conventional virtual addressing, the programmed address corresponds to the virtual address, and the real address corresponds to the physical address; see FIG. 1). Buffers (also known as translation lookaside buffers (TLBs) in microcontrollers of the MPC 5554 type) are provided for programming the translation address that makes it possible to go from the programmed address to the real address. The microcontroller thus manages four buffers for the two partitions that may be executed at any given instant:

a buffer for the code and a buffer for the data of the partition P0 allocated to the real time core; and a buffer for the code and a buffer for the data of the partition PX allocated to the task that is active at said instant.

All accesses to code and to data take place via the buffers: when a buffer is erased, access to the physical address is not possible. Thus, by using only four buffers, only two desired partitions are accessible (the real time core and the selected application task). The other partitions are inaccessible.

Furthermore, it is possible to give supervisor and user permissions to the buffers in order to protect the partition P0 (supervisor mode) allocated to the real time core against undesired access by an application partition executing in user mode.

The real time core is also arranged to implement timing so as to allocate execution time to each of the partitions P1 to P3. The timing is organized as a multiple of a base cycle that is clocked by a clock interrupt of the microcontroller, and the task activated by the interrupt calls the time management routine of the real time core so that the real time core takes over control on each interrupt in order to decide whether execution of the current partition should be suspended. In this example, the real time core is more particularly arranged to control execution of the partitions, and thus of the tasks, in an execution cycle that is circular. The execution cycle includes a time reserve interval R enabling new partitions to be added by taking their execution times from the time reserve.

The partition P0 allocated to the real time core contains memory pages (PM1 to PM6), each of which is allocated to a respective task (T1 to T6) in order to contain the registers of each of the tasks, the real time core being arranged to manage a task pointer (PT) for containing the address of the task page currently being executed.

The partition P0 allocated to the real time core contains a list of tasks ready to be executed and organized by partition (LTP1 to LTP3), and the real time core is arranged to manage a partition pointer (PP) in order to access the list of ready tasks (LTP1 to LTP3).

Each list of ready tasks (LTP1 to LTP3) is in the form of a chaining head that contains the context addresses of the first and last of the tasks that are ready to be executed. The real time core keeps an up-to-date list of the tasks that are ready as a function of the occurrences of events (such as function calls or interrupts) that serve to trigger said tasks. In addition, the real time core takes account of priorities that may be allocated to each of the tasks for the purpose of ordering the list of ready tasks.

When execution of the ready tasks of each partition is launched, the real time core triggers a time-out, and at the end of that time-out, it suspends the execution of said partition in order to launch the execution of the ready tasks of the following partition.

Partition changing is performed by updating the partition pointer.

The change of context prior to executing a new task is performed by loading the task pointer PT with the address of the memory page containing the registers of the task that is to be executed. The above-described structure for the control unit enables the context change mode of the invention to be implemented in a manner that is particularly effective since it makes it possible, specifically, to modify the program instructions and the peripherals of the microcontroller.

A change of context (task or partition) is fast and of constant duration. Its duration is independent firstly of the number of internal registers of the microcontroller, and secondly of the number of ready tasks or the number of partitions to be managed.

The invention thus makes it possible for the microcontroller to perform multi-tasking operation in real time, while nevertheless complying with the ARINC 653 standard and while limiting the cost of the control unit.

In conventional manner, the partition P0 allocated to the real time core contains other chained lists for managing the resources of the real time core (time delays, queues, . . . ).

Naturally, the invention is not limited to the embodiments described but covers any variant coming within the ambit of the invention as defined by the claims.

In particular, the partitions may be of sizes that are identical or different.

The execution cycle may include any given partition one or more times.

Various means for avoiding backing up and subsequent restoration of registers can be envisaged:
- modifying register access instructions in order to access them in indexed mode, with the index being provided by the task pointer, as opposed to accessing them in direct mode;
- when the address of the register zone is configurable, authorizing dynamic reconfiguring (not only at start up) with the help of the task pointer (no modification of the instructions); and
- creating an address bus dedicated to the registers in which an address zone can be configured dynamically using the task pointer.

The electronic unit may be of a structure that is different from that described. For example, the ROM 2 may equally be of the electrically erasable programmable read-only memory (EEPROM) type or of the non-volatile memory (NVM) type.

The invention claimed is:

1. An electronic control unit comprising a microcontroller having ROM containing code of a software operating system incorporating a real-time core for executing computer tasks, and RAM containing variable data relating to the real-time core and the tasks, the RAM and ROM including zones corresponding to partitions, one of which is allocated to the real-time core, while each of the others is allocated to at least one of the tasks, the ROM and the RAM being associated with an address bus that is physically programmed to prevent each partition firstly from writing in another one of the zones of the RAM, and secondly from executing another one of the zones of the ROM, and the real-time core is associated with a timer for allocating an execution time to each partition, wherein the partition allocated to the real-time core contains a list of tasks ready to be executed and organized by partition, and the real-time core is arranged to manage a partition pointer for accessing the list of ready tasks and the list of ready tasks is in the form of a chaining head that contains the context addresses of the first and last tasks that are ready to be executed.

2. The unit according to claim 1, wherein the real-time core is arranged to cause the partitions to be executed in an execution cycle that is circular.

3. The unit according to claim 2, wherein the execution cycle includes a given partition several times over.

4. The unit according to claim 2, wherein the execution cycle includes a time reserve interval.

5. The unit according to claim 1, wherein the partition allocated to the real-time core contains memory pages each of which is allocated to a task in order to contain the registers of each task, the real-time core being arranged to manage a task pointer for containing the address of the page of the task that is being executed.

6. The unit according to claim 1, wherein the control unit is a microcircuit including a set of instructions for a microcontroller and for peripherals of such a microcontroller.

7. The unit according to claim 1, wherein the microcontroller is a programmable logic array.

8. An electronic control unit comprising a microcontroller having ROM containing code of a software operating system incorporating a real-time core for executing computer tasks, and RAM containing variable data relating to the real-time core and the tasks, the RAM and ROM including zones corresponding to partitions, one of which is allocated to the real-time core, while each of the others is allocated to at least one of the tasks, the ROM and the RAM being associated with an address bus that is physically programmed to prevent each partition firstly from writing in another one of the zones of the RAM, and secondly from executing another one of the zones of the ROM, and the real-time core is associated with a timer for allocating an execution time to each partition, the electronic control unit being arranged so that only two partitions may be executed at a given instant and the microcontroller being arranged to manage only four buffers for said two partitions:
- a buffer for the code and a buffer for the data of the partition allocated to the real-time core; and
- a buffer for the code and a buffer for the data of the partition allocated to the task that is active at said instant.

9. The unit according to claim 8, wherein the real-time core is arranged to cause the partitions to be executed in an execution cycle that is circular.

10. The unit according to claim 9, wherein the execution cycle includes a given partition several times over.

11. The unit according to claim 9, wherein the execution cycle includes a time reserve interval.

* * * * *